(12) United States Patent
Hirata et al.

(10) Patent No.: US 8,438,202 B2
(45) Date of Patent: May 7, 2013

(54) MECHANISM FOR GENERATING RANDOM NUMBERS FOLLOWING NORMAL DISTRIBUTION

(75) Inventors: Yoshito Hirata, Tokyo (JP); Kazuyuki Aihara, Narashino (JP)

(73) Assignee: Japan Science and Technology Agency (JP)

( * ) Notice: Subject to any disclaimer, the term of this patent is extended or adjusted under 35 U.S.C. 154(b) by 603 days.

(21) Appl. No.: 12/741,101

(22) PCT Filed: Dec. 24, 2008

(86) PCT No.: PCT/JP2008/073389
§ 371 (c)(1),
(2), (4) Date: May 3, 2010

(87) PCT Pub. No.: WO2009/084524
PCT Pub. Date: Jul. 9, 2009

(65) Prior Publication Data
US 2010/0268751 A1    Oct. 21, 2010

(30) Foreign Application Priority Data
Dec. 27, 2007    (JP) ................. 2007-336691

(51) Int. Cl.
*G06F 7/58*    (2006.01)
(52) U.S. Cl.
USPC ........................................... 708/250
(58) Field of Classification Search .......... None
See application file for complete search history.

(56) References Cited

U.S. PATENT DOCUMENTS

| | | | |
|---|---|---|---|
| 2008/0183786 A1* | 7/2008 | Shimizu | 708/250 |
| 2008/0320067 A1* | 12/2008 | Swarts et al. | 708/252 |
| 2010/0057653 A1* | 3/2010 | Wilber | 706/22 |
| 2012/0221615 A1* | 8/2012 | Cerf et al. | 708/250 |

FOREIGN PATENT DOCUMENTS

JP    2004-073520    3/2004

OTHER PUBLICATIONS

Press et al., Numerical Recipes in C, The Art of Scientific Computing, 2nd edition, 1992, pp. 288-291, Cambridge, UK.
Donald E. Knuth, The Art of Computer Programming, vol. 2, 3rd edition, 1997, pp. 1-41, Reading, Massachusetts.
Eckmann et al., Recurrence Plots of Dynamical Systems, 1987, pp. 973-977, Europhysics Letters 4 (9).
Marwan at al., Recurrence plots for the analysis of complex systems, 2007, pp. 237-329, Physics Reports 438, Elsevier B.V.
Marwan et al., Recurrence-plot-based measures of complexity and their application to heart-rate-variability data, 2002, pp. 1-8, Physical Review E 66, 026702, The American Physical Society.
Zbilut et al., Enibeddings and delays as derived from quantification of recurrence plots, 1992, pp. 199-203, Physics Letters A 171, Elsevier Science Publishers B.V.
Trulla et al., Recurrence quantification analysis of the logistic equation with transients, 1996, pp. 255-260, Physics Letter A 223, Elsevier Science Publishers B.V.
Faure at al., A new method to estimate the Kolmogorov entropy from recurrence plots: its application to neuronal signals, 1998, pp. 265-279, Physics D 122, Elsevier Science Publishers B.V.

(Continued)

*Primary Examiner* — David H Malzahn
(74) *Attorney, Agent, or Firm* — Bacon & Thomas, PLLC

(57) ABSTRACT

There is provided a mechanism for generating random numbers following the normal distribution which does not generate a sequence correlation. The mechanism for generating random numbers following the normal distribution includes: a random recurrence plot generating mechanism 1 for generating random recurrence plots; and a recurrence plot-time series converting mechanism 4 for converting the random recurrence plots from the random recurrence plot generating unit 1 into time series, wherein Gaussian random numbers are generated by the recurrence plot-time series converting mechanism 4.

6 Claims, 6 Drawing Sheets

OTHER PUBLICATIONS

Romano et al., Estimation of dynamical invariants without embedding by recurrence plots, 2004, pp. 234-243, Chaos, vol. 14, No. 2, American Institute of Physics.

Christophe Letellier, Esitmating the Shannon Entropy: Recurrence Plots versus Symbolic Dynamics, 2006, pp. 1-4, Physical Review Letters 96, 254102, The American Physical Society.

Thiel et al, How much information is contained in a recurrence plot?, 2004, pp. 343-349, Physics Letters A 330, Elsevier Science Publishers B.V.

McGuire et al., Recurrence matrices and the preservation of dynamical properties, 1997, pp. 43-47, Physics Letters A 237, Elsevier Science Publishers B.V.

Kruskal et al., Multidimensional Scaling, 1978, pp. 6-31, Sage Publications, Murray Hill, New Jersey.

E. W. Dijkstra, A Note on Two Problems in Connexion with Graphs, 1959, pp. 269-271, Numerische Mathematik 1.

J.C. Gower, Some Distance Properties of Latent Root and Vector Methods Used in Multivariate Analysis, 1966, pp. 325-338, Biometrika, vol. 53, No. 3/4, http://www.jstor.org.

Elmaci et al., Principal coordinate analysis on a protein model, 1999, pp. 10606-10622, Journal of Chemical Physics, vol. 110, No. 21, The American Institute of Physics.

Edward N. Lorenz, Deterministic Nonperiodic Flow, 1963, pp. 130-141, Journal of the Atmospheric Sciences, vol. 20.

O.E. Rossler, An Equation for Continuous Chaos, 1976, pp. 397-398, Physics Letters, vol. 57A, No. 5.

Cover at al., Elements of Information Theory, Maximum Entropy and Spectral Estimation, Chapter 11, 1991, pp. 267-278, John Wiley & Sons, Inc., New York.

Alligood et al., Chaos—An Introduction to Dynamical Systems, 1996, pp. 112-125, 256-261, Springer-Verlag, New York.

* cited by examiner (a)

(b)

(c)

US 8,438,202 B2

MECHANISM FOR GENERATING RANDOM NUMBERS FOLLOWING NORMAL DISTRIBUTION

TECHNICAL FIELD

The present invention relates to a mechanism for generating random numbers.

BACKGROUND ART

Random numbers following the normal distribution are widely used for simulations in science and technology. The common method for generating the random numbers using a computational algorithm is to first generate random numbers following the uniform distribution and then convert them into the normal distribution either by using the central limit theorem or the Box-Muller algorithm (see Non-Patent Document 1 below). Thus random numbers following the normal distribution generated in such a way succeed the drawbacks for those of random numbers following the uniform distribution. The common methods for generating the random numbers following the uniform distribution are linear or quadratic congruential generators or Fibonacci series (see Non-Patent Document 2 below).

Recurrence plots are introduced in Non-Patent Document 3 below.

Non-Patent Document 1: W. H. Press, S. A. Teukolsky, W. T. Vetterling, and B. P. Flannery, Numerical recipes in C, 2nd edition, Cambridge University Press, Cambridge, UK, 1992

Non-Patent Document 2: D. E. Knuth, The art of computer programming, Volume 2, 3rd edition, Addison-Wesley, Reading, Mass., 1997

Non-Patent Document 3: J. P. Eckmann, S. O. Kamphorst; and D. Ruelle, Europhys. Lett. 4, 973 (1987)

Non-Patent Document 4: N. Marwan, M. C. Romano, M. Thiel, and J. Kurths, Phys. Rep. 438, 237 (2007)

Non-Patent Document 5: N. Marwan, N. Wessel, U. Meyerfeldt, A. Schirdewan, and J. Kurths, Phys. Rev. E66, 026702 (2002)

Non-Patent Document 6: J. P. Zbilut and C. L. Webber Jr., Phys. Lett. A 171, 199 (1992)

Non-Patent Document 7: L. L. Trulla, A. Giuliani, J. P. Zbilut, C. L. Webber Jr., Phys. Lett. A 223, 255 (1996)

Non-Patent Document 8: P. Faure and H. Korn, Physica D 122, 265 (1998)

Non-Patent Document 9: M. Thiel, M. C. Romano, P. L. Read, and J. Kurths, Chaos 14, 234 (2004)

Non-Patent Document 10: C. Letellier, Phys. Rev. Lett. 96, 254102 (2006)

Non-Patent Document 11: M. Thiel, M. C. Romano, J Kurths, Phys. Lett. A 330, 343 (2004)

Non-Patent Document 12: G. McGuire, N. B. Azar, M. Shelhamer, Phys. Lett. A 237, 43 (1997)

Non-Patent Document 13: J. B. Kruskal and M. Wish, Multidimensional Scaling, Sage Publications, 1978

Non-Patent Document 14: E. W. Dijkstra, Numer. Math. 1 269 (1959)

Non-Patent Document 15: J. C. Gower, Biometrica 53, 325 (1966)

Non-Patent Document 16: N. Elmaci and R. S. Berry, J. Chem. Phys. 110, 10606 (1999)

Non-Patent Document 17: E. N. Lorenz, J. Atmos. Sci. 20, 130 (1963)

Non-Patent Document 18: O. E. Rossler, Phys. Lett. 57A, 397 (1976)

Non-Patent Document 19: T. M Cover and J. A. Thomas, Elements of Information Theory, John Wiley & Sons, Inc., New York, 1991

Non-Patent Document 20: K. T. Alligood, T. D. Sauer, and J. A. Yorke, Chaos: An introduction to dynamical systems, Springer-Verlag, New York, 1997

SUMMARY OF THE INVENTION

The methods for generating random numbers following the uniform distribution described above can be regarded as a finite-dimensional dynamical system. Since in a dynamical system the past decides the future completely; correlations between different points in the random number series cannot be avoided.

There are some known methods using shuffling for generating more complex random numbers following the uniform distribution from two or more random numbers following the uniform distribution. These methods are also required to generate the original random numbers following the uniform distribution using the methods described above, so that the result contains a serial correlation. With the serial correlation, the future series can be predicted from the past series. As Such, the random numbers following the normal distribution generated by the existing methods may be problematic in the advanced computer simulations or secure communications. Although there are physical random numbers generated by using a physical system, such physical random numbers as generating the normal distribution are also a dynamical system and thus contain the serial correlation.

The random numbers following the normal distribution generated by the prior art inevitably contain the serial correlation. As such, there is a need for a method of generating random numbers following the normal distribution which do not generate the serial correlation.

In view of the above, the present invention is directed to provide a mechanism for generating random numbers following the normal distribution which does not generate the serial correlation.

To achieve the above objects, the present invention provides the following:

[1] A mechanism for generating random numbers following the normal distribution including: a random recurrence plot generating mechanism for generating random recurrence plots; and a recurrence plot-time series converting mechanism for converting the random recurrence plots from the random recurrence plot generating mechanism into time series, wherein Gaussian random numbers are generated by the recurrence plot-time series converting mechanism.

[2] The mechanism for generating random numbers following the normal distribution according to [1], wherein the random recurrence plot generating mechanism includes a bit random number generating unit for generating bit random numbers and a recurrence plot storing unit for storing the bit random numbers generated by the bit random number generating unit as recurrence plots, and wherein the recurrence plot-time series converting mechanism includes a graph generating unit for generating a graph using information from the recurrence plot storing unit, a distance matrix generating unit for generating distance matrices using information from the graph generating unit, and a time series generating unit for generating time series using information from, the distance matrix generating unit.

[3] The mechanism for generating random numbers following the normal distribution according to [1], wherein the recurrence plots are two-dimensional plots with two axes of time indexes for visualizing the time series, obtained by examining a pair of corresponding time indexes to see if they are neighbors, and plotting a corresponding point on a two-dimensional plane if they are or no point if not.

[4] The mechanism for generating random numbers following the normal distribution according to [2], wherein the bit random numbers are generated by applying a mechanism following the quantum mechanics.

[5] The mechanism for generating random numbers following the normal distribution according to [4], wherein the mechanism following the quantum mechanics is spin orientations or time intervals of gamma-ray radiation.

[6] The mechanism for generating random numbers following the normal distribution according to [2], wherein the bit random numbers are generated by applying a one-dimensional chaos map implemented with electronic circuits.

DETAILED DESCRIPTION OF THE EMBODIMENTS

A mechanism for generating random numbers following the normal distribution according to the present invention includes a random recurrence plot generating mechanism for generating random recurrence plots and a recurrence plot-time series converting mechanism for converting the random recurrence plots from the random recurrence plot generating mechanism into time series, wherein Gaussian random numbers are generated by the recurrence plot-time series converting mechanism.

Embodiments

Embodiments of the present invention will be described in detail hereinbelow.

Figure 1:
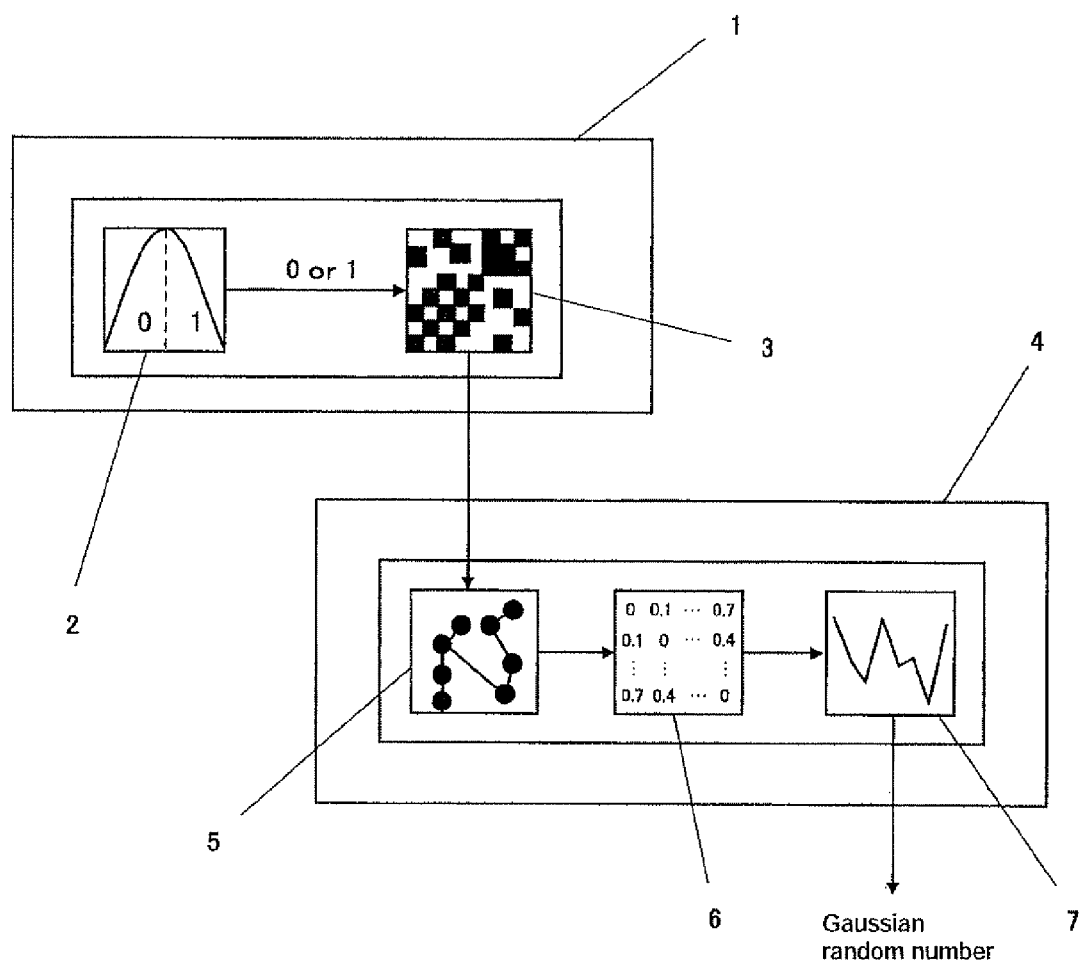
FIG. 1 is a block diagram of a mechanism for generating random numbers following the normal distribution, showing an embodiment of the present invention.

FIG. 1 is a block diagram of a mechanism for generating random numbers following the normal distribution, showing an embodiment of the present invention.

In this figure, the mechanism for generating random numbers following the normal distribution of the present invention includes a random recurrence plot generating mechanism 1 and a recurrence plot-time series converting mechanism 4. The random recurrence plot generating mechanism 1 includes a bit random number generating unit 2 and a recurrence plot storing unit 3 for storing the bit random numbers generated by the bit random number generating unit 2 as recurrence plots. The recurrence plot-time series converting mechanism 4 is provided with a graph generating unit 5 for generating a graph using information from the recurrence plot storing unit 3, a distance matrix generating unit 6 for generating distance matrices using the information from the graph producing unit 5, and a time series generating unit 7 for generating time series using the information from the distance matrix generating unit 6. The time series generating unit 7 generates Gaussian random numbers.

In this way, the mechanism for generating random numbers following the normal distribution of the present invention generates the random recurrence plots, which are generally random, using "0" or "1" information from the bit random number generating unit 2, and converts the recurrence plots into the time series.

The recurrence plots are two-dimensional plots used to visualize a time series. Both axes show time indexes. A pair of corresponding time indexes is examined to see if they are neighbors, and if they are, a corresponding point on a plane is plotted. If not, no point is plotted. In the recurrence plots of the Gaussian random numbers, the points are randomly distributed. Thus, using the bit random numbers allows generating the recurrence plots corresponding to the Gaussian random numbers.

The recurrence plots generated by the random recurrence plot generating mechanism 1 are converted into a graph by the graph generating unit 5. In this graph, each node corresponds to each time. If the two corresponding time phases are neighbors, i.e., the points are plotted on the corresponding recurrence plots, the corresponding nodes on the graph are connected by an edge. The edge is determined by considering the points plotted in a column of the recurrence plots corresponding to each time. Next, the shortest distance between the nodes on the obtained graph is calculated. The shortest distance is converted to the time series with the multidimensional scaling by converting the points in the real space into positions. The obtained time series corresponds, to the Gaussian random numbers. The obtained time series is distributed normally because the time series entropy is maximized under the constraint of mean and variance (see Non-Patent Document 19).

In the mechanism for generating random numbers following the normal distribution of the present invention, a serial correlation does not exist in the obtained random numbers because the recurrence plot generated from the bit random numbers. The bit random numbers can be generated by applying the mechanism following the quantum mechanics, such as spin orientations, time intervals of gamma-ray radiation, or a one-dimensional chaos map implemented with electronic circuits.

Thus, the Gaussian random numbers can be generated by generating the random recurrence plots and returning them into the time series.

The embodiments of the present invention will be described in detail hereinbelow.

First, the procedure will be explained on how the original time series can be reproduced from the recurrence plots.

The recurrence plots, introduced by J. P. Eckmann (see Non-Patent Document 3) or N. Marwan (see Non-Patent Document 4), are excellent visual tools in two-dimensional space for describing the dynamics in m-dimensional phase space $R^m$.

Suppose it is given a time series $[x_i \in R^m : i=1, 2, \ldots, n]$. If a distance between $x_i$ and $x_j$ is less than a predefined threshold $\epsilon$, a point is plotted at $(i,j)$. That is, the recurrence plot $R_{i,j}$ can be defined as $$R_{ij} = \Theta(\epsilon - \|x_i - x_j\|)$$

where $\Theta$ is the Heaviside function.

The uniform distribution of the points in the recurrence plots implies stationarity, while diagonal lines characterize determinism and periodicity. The recurrence plots have been used for investigating, for example, heart-rate variability (see Non-Patent Document 5). There is some work that tries to quantify dynamics from the recurrence plots (see Non-Patent Documents 5-10). Especially, from the recurrence plots, it can be calculated correlation entropy and correlation dimension (see Non-Patent Documents 8 and 9). Thus the recurrence plots contain much information on dynamics of the original time series.

On how much information on the original time series is contained in the recurrence plot, Non-Patent Document 11 above showed that if the recurrence plot is obtained from a scalar time series using the one-dimensional space, then the original time series can be reproduced. Then a problem is that whether the result can be extended to a high-dimensional case or not.

The present invention suggests that the original time series can be reproduced even when the recurrence plot is obtained using a multidimensional phase space. It is known that the original time series can be reproduced when the distance matrix representing the distance between any two points is given (see Non-Patent Document 12).

The multidimensional scaling can also be used to convert the distance matrix to points in the phase space (see Non-Patent Document 12). Thus the original time series can be reproduced if the distance matrix can be reproduced from the recurrence plot.

First, suppose that the recurrence plot is given. $G_i$ is a set of columns of time indexes having plots in the i-th row, i.e., $G_i=\{j:R_{i,j}=1\}$.

(1) Build a graph from the recurrence plot. In this graph, each node corresponds to each time index, and there is an edge between a pair of nodes if the corresponding pair of time indexes is plotted in the recurrence plot. For simplicity, the time indexes of the recurrence plot are used herein for labeling the nodes in the graph.

(2) For each edge between nodes i and j, assign a weight by $1 - \frac{|G_i \cap G_j|}{|G_i \cup G_j|}$, where |A| is the number of elements for a set A.

(3) Calculate, the shortest distance for each pair of nodes in the graph. This can be done, for example, by the Dijkstra method (see Non-Patent Document 14), and a distance matrix can be obtained. The Dijkstra method for obtaining the distance matrix is widely used for finding the shortest route between two cities. Other methods may be used herein.

(4) Next, apply the multidimensional scaling to the distance matrix obtained in (3). In the present invention, the method according to Non-Patent Document 15 is used. For drawing the graph, choose the component with the largest eigenvalue among the results. The multidimensional scaling according to Non-Patent Document 15 itself returns n-dimensional time series. By plotting only the components with large eigenvalues, this method is used for visualizing, for example, protein structures (see Non-Patent Document 16). Methods other than that described in Non-Patent Document 15 may be used herein.

When building the recurrence plot for this purpose, it is required to decide a threshold of the recurrence plot so that all the nodes in the corresponding graph are connected. In addition, if all the nodes are connected, the distances on the graph make a metric. The distance on the graph is represented by $\tilde{d}$. Assume that $G_i$s are different with each other. Then it is easy to confirm that $\tilde{d}$ satisfies all the conditions of metric. That is, it satisfies the following conditions:

(a) for every pair of time indexes, $\tilde{d}(x_i,x_j) \geq 0$, and $\tilde{d}(x_i,x_j)=0$ only when $x_i=x_j$ (b) $\tilde{d}$ is symmetric, or $[\tilde{d}(x_i,x_j)=\tilde{d}(x_j,x_i)]$ (c) the triangle inequality holds $[\tilde{d}(x_i,x_k) \leq \tilde{d}(x_i,x_j)+\tilde{d}(x_j,x_k)]$ Furthermore, the metric $\tilde{d}$ is equivalent to the Euclidean metric under mild conditions.

Figure 2:
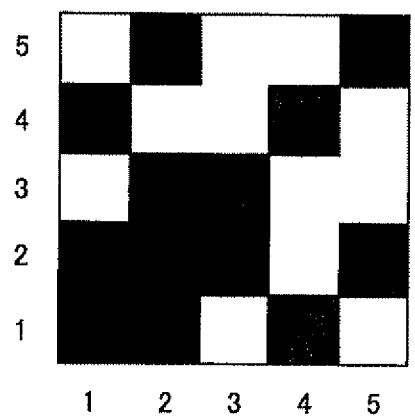
FIG. 2 shows an example of a recurrence plot according to the present invention.
Figure 2:
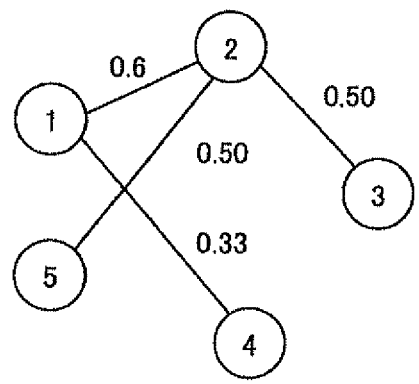
Figure 2:
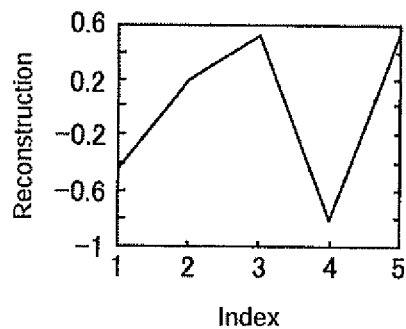

FIG. 2 shows an example of a recurrence plot time-series conversion procedure for obtaining the time series from the recurrence plot according to the present invention.

Suppose that the recurrence plot shown in FIG. 2(a) is given. From this, a graph shown in FIG. 2(b) is obtained. For example, comparison of the sets having plots in the first and second rows shows that there are 5 time indexes in the union and there are 2 time indexes in the product set, so that the edge between 1 and 2 is assigned the weight 1−(2/5)=0.6. By calculating the distance between each pair of nodes, the following distance matrix is obtained:

$$\begin{pmatrix} 0 & 0.60 & 1.10 & 0.33 & 1.10 \\ 0.60 & 0 & 0.50 & 0.93 & 0.50 \\ 1.10 & 0.50 & 0 & 1.43 & 1.00 \\ 0.33 & 0.93 & 1.43 & 0 & 1.43 \\ 1.10 & 0.50 & 1.00 & 1.43 & 0 \end{pmatrix}$$

Then the time series as shown in FIG. 2(c) is obtained by applying the multidimensional scaling.

Figure 3:
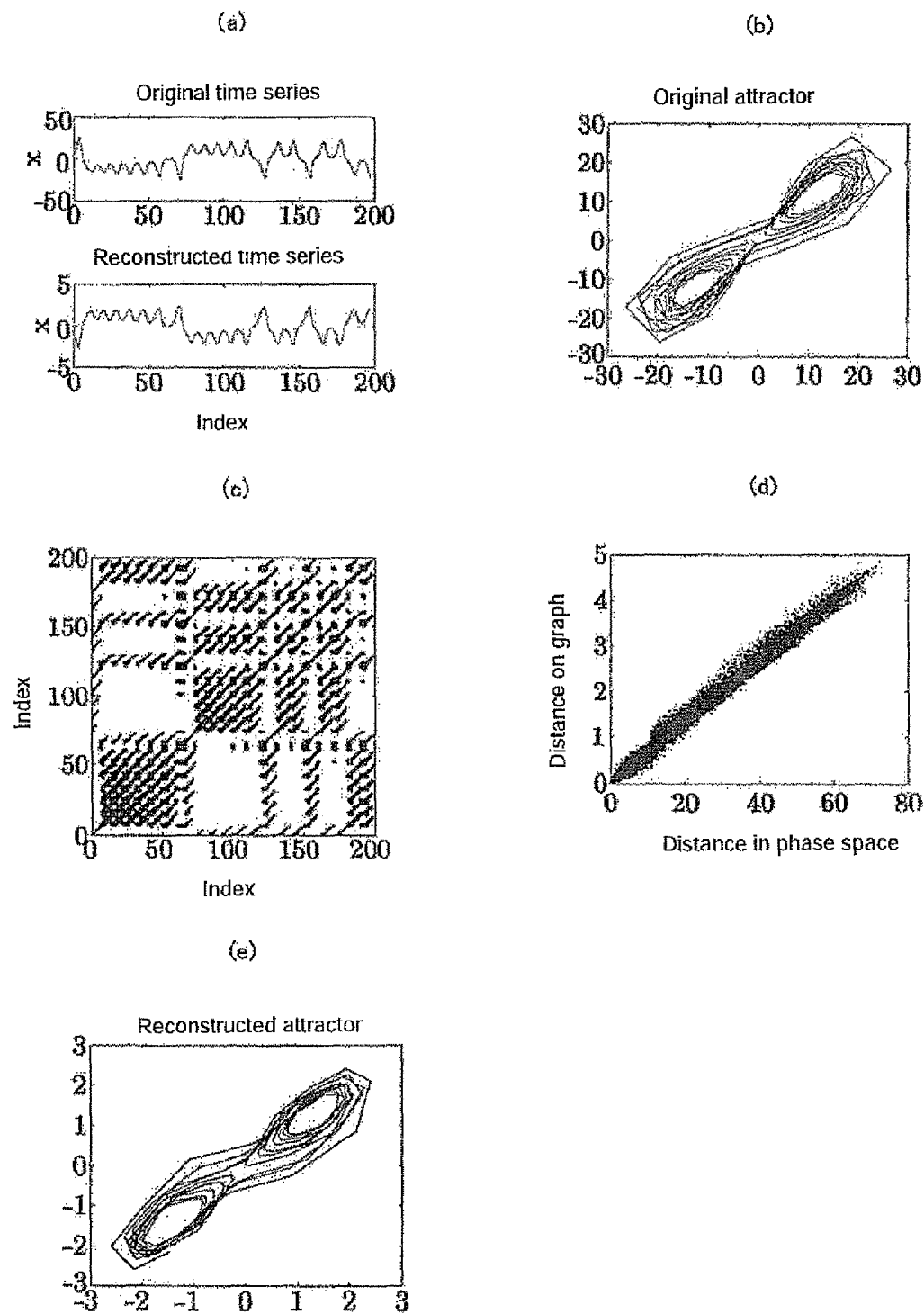
FIG. 3 shows an example of the Lorenz model according to the present invention.

FIG. 3 shows an example of the Lorenz model according to the present invention. Next, the present method is applied to the Lorenz model (see Non-Patent Document 17). The Lorenz model is defined as $\dot{x}=-16(x-y)$, $\dot{y}=-xz+40x-y$, $\dot{z}=xy-4z$.

Figure 4:
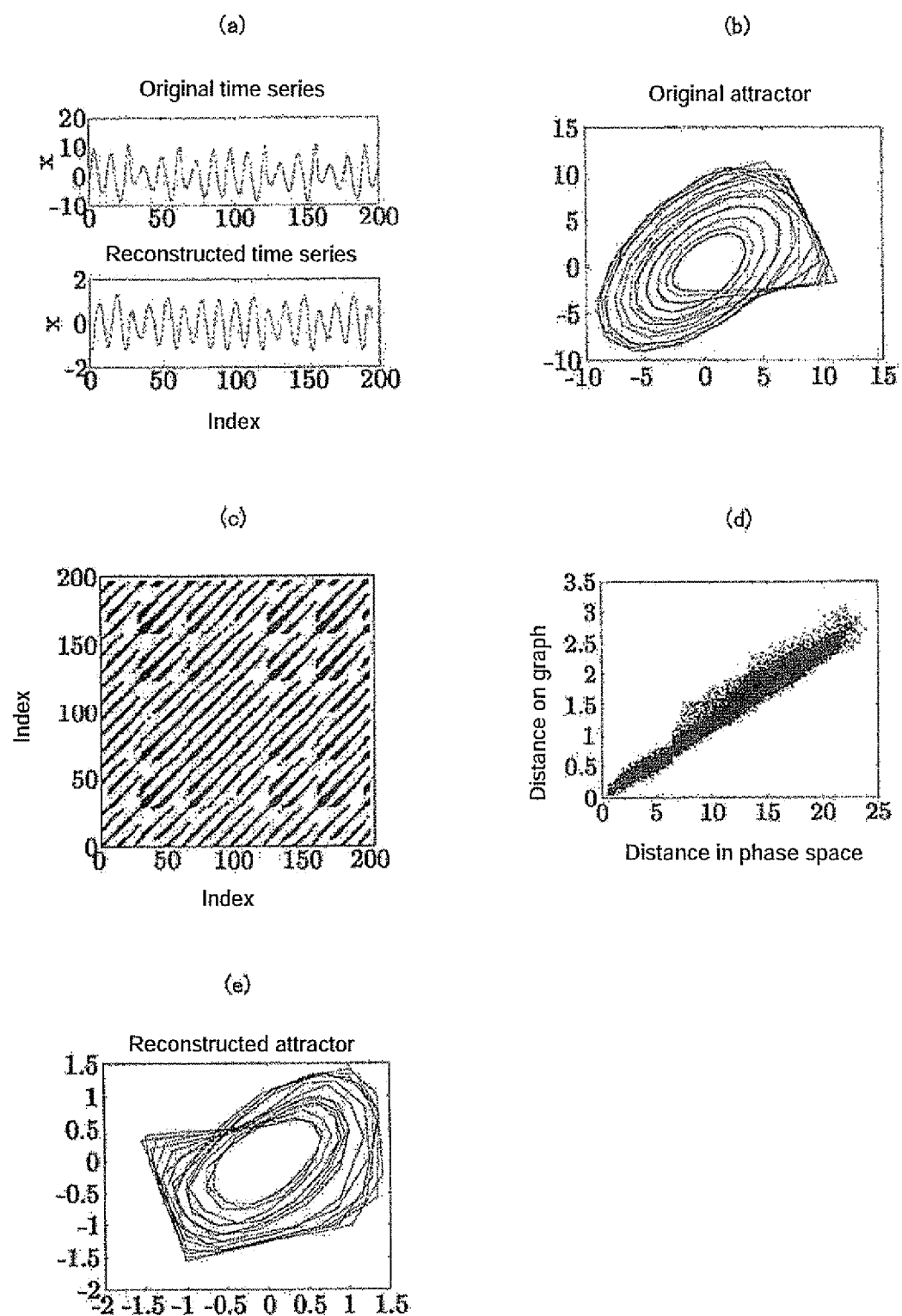
FIG. 4 shows an example of the Rossler model according to the present invention.

Here, the x-coordinate is observed every 0.05 unit time and a time series of length 200 is generated (FIG. 3(a) (upper)). The time series is embedded using delay coordinates [x(t), x(t−0.05), x(t−0.1)] (its two-dimensional projection is shown in FIG. 3(b)) to calculate the distance for generating the recurrence plot (FIG. 3(c)). The Euclidean distance is used and the threshold for the recurrence plot is decided so that 20% pairs of the time indexes are plotted. In this case, the reconstructed attractor in FIG. 3(e) looks similar to that of the original data in FIG. 3(b) although it is upside-down (see FIG. 3(a) (lower)). The correlation coefficient of the distances in the embedded space and those on the graph is 0.99 (FIG. 3(d)). The similar result can be obtained by using the maximum norm. FIG. 4 shows an example of the Rössler model according to the present invention. Herein, the present method is also applied to the Rössler model (see Non-Patent Document 18). The Rössler model is defined as $\dot{x}=-(y+z)$, $\dot{y}=x+0.2y$, and $\dot{z}=0.2+z(x-5.7)$.

Here, the x-coordinate is observed every 0.5 unit time and a time series of length 200 is generated (FIG. 4(a) (upper)). The time series is embedded using delay coordinates [x(t), x(t−0.5), x(t−1)] (its two-dimensional projection is shown in FIG. 4(b)) to generate the recurrence plot as shown in FIG. 4(c) using the Euclidean distance and the threshold so that 20% pairs of the time indexes are plotted. The distances in the embedded spade and those on the graph are well correlated with each other, and the correlation coefficient is 0.98. Although the reconstructed time series is upside-down (FIG.

4(a) (below)), the reconstructed attractor shown in FIG. 4(e) is topologically equivalent to the original attractor shown in FIG. 4(b).

Next, the Gaussian random numbers that can be finally obtained will be described.

Figure 5:
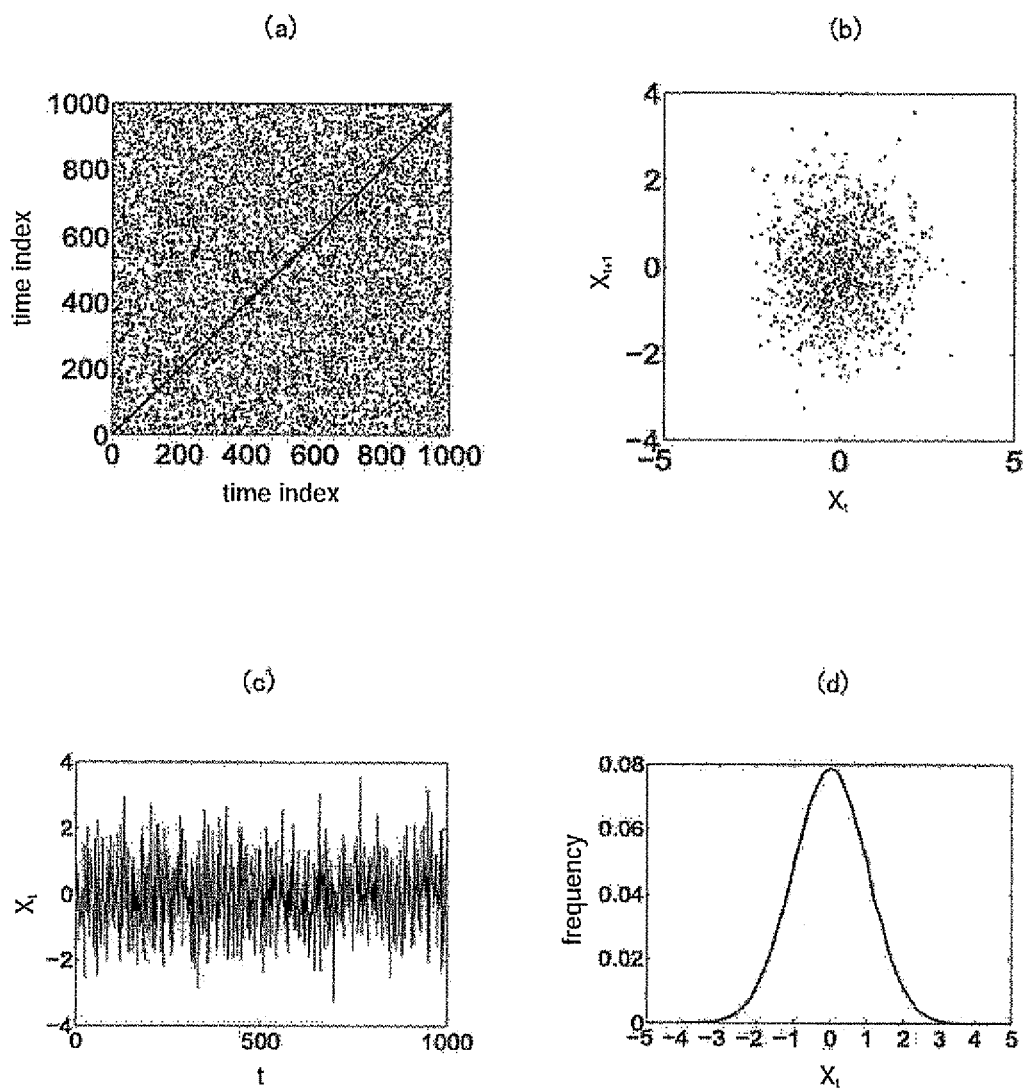
FIG. 5 shows a recurrence plot of Gaussian random numbers according to the present invention, a scatter plot of the Gaussian random numbers generated from the recurrence plot, a time scale thereof, and a histogram thereof.

FIG. 5 shows a recurrence plot of Gaussian random numbers according to the present invention, a scatter plot of Gaussian random numbers generated from the recurrence plot, a time series thereof, and a histogram thereof. FIG. 5(a) shows, the recurrence plot of Gaussian random numbers generated by MATLAB's random, FIG. 5(b) shows the scatter plot generated according to the present invention, FIG. 5(c) shows its time series, and FIG. 5(d) shows the histogram of Gaussian random numbers generated according to the present invention. The histogram is obtained by using 100 realizations of Gaussian random numbers of length 1000.

For a series of recurrence plots following the normal distribution, the points spread uniformly and randomly as shown in FIG. 5(a). Since the random numbers following the normal distribution maximize the entropy of time series, they also maximize the entropy of the recurrence plots. Although the word "entropy" is often used for quantifying the recurrence plots, it herein simply refers to the information contents in the recurrence plots. The information contents are $(n-1)(n-2)/2$ free bits in the recurrence plots. For the purpose of maximizing the entropy, these bits may be decided by flipping a coin. Instead of actually flipping a coin, the following example uses the logistic map $y_{t+1}=4y_t(1-y_t)$, and assigns $Y_t=0$ if $y_t<0.5$ or $Y_t=1$ otherwise and the following set:

$$R_{i,j} = Y_{\frac{2(i-1)n-i(i-1)}{2}+j-i}$$

A symbol sequence generated in this way can be regarded as a memoryless random binary sequence (see Non-Patent document 20).

Figure 6:
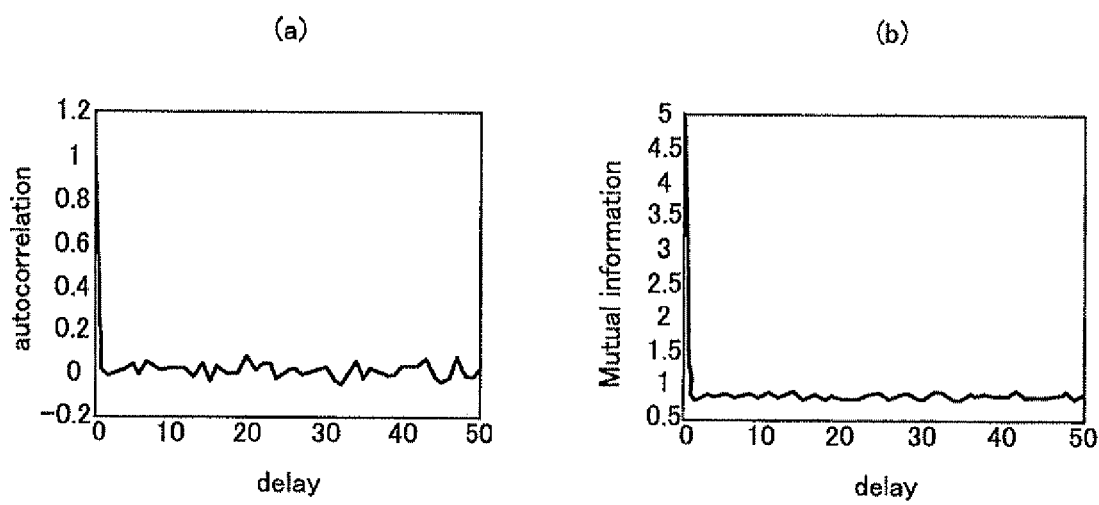
FIG. 6 shows an autocorrelation and mutual information of the Gaussian random numbers generated according to the present invention.

FIG. 6 shows the autocorrelation and mutual information quantity of Gaussian random numbers generated according to the present invention. FIG. 6(a) shows the autocorrelation of Gaussian random numbers generated according to the present invention, and FIG. 6(b) shows the mutual information thereof.

By using the method described above, the recurrence plots of the random numbers following the normal distribution can be obtained. At this time, the time series shown in FIG. 5(c) is obtained. Here, the time series is changed so that the mean and standard deviation are 0 and 1, respectively. The generated scatter plot of the normal distribution does not show any pattern as shown in FIG. 5(b). This time series does not have correlations between different time indexes. The autocorrelation and mutual information between points separated by a certain delay of time are flat and do not show any meaningful information (see FIG. 6). The Kolgomorov Smirnov test (see Non-Patent Document 1) cannot distinguish the cumulative distribution of the obtained time series from that of the normal distribution. When all the points in FIG. 5(d) are used, the p-value of 0.33 is obtained.

The multidimensional scaling according to Non-Patent Document 15 has a close relationship with the principal component analysis and returns independent components. In addition, n-dimensional time series can be obtained from the time series of length n, and the components of each dimension follow the normal distribution. Given that the degree of freedom of the recurrence plots is $n(n-1)/2$, the first $(n-1)/2$-dimension is regarded to be independent. That is, in the present invention, $n(n-1)/2$-bit random numbers generates $n(n-1)/2$ Gaussian random numbers. In addition, the accuracy of the obtained Gaussian random numbers depends on the accuracy of assignment of weight in a graph, which is $\log_2$ n-bit. In the case where Gaussian random numbers with $\log_2$ n-bit accuracy are generated using $n(n-1)/2$-bit random numbers and the Box-Muller algorithm, only as few as $n(n-1)/(2 \log_2 n)$ Gaussian random numbers are obtained. Although it is considered that The Box-Muller algorithm can generate more Gaussian random numbers by reusing the bit random numbers, deciding the method of reusing the random numbers deterministically leads to a confidentiality problem, and deciding the method stochastically requires more bit random numbers, so that reusing the random numbers is not appropriate. That is, when n is greater than 2, the present method can generate more Gaussian random numbers than any combination of the existing methods does.

The present invention depends on the performance of the random bit generating mechanism. As long as the bits can be generated randomly, the present invention can be considered to generate the random numbers following the normal distribution utilizing the system following the infinite-dimensional stochastic process. This means that the future is unpredictable from the past.

Figure 7:
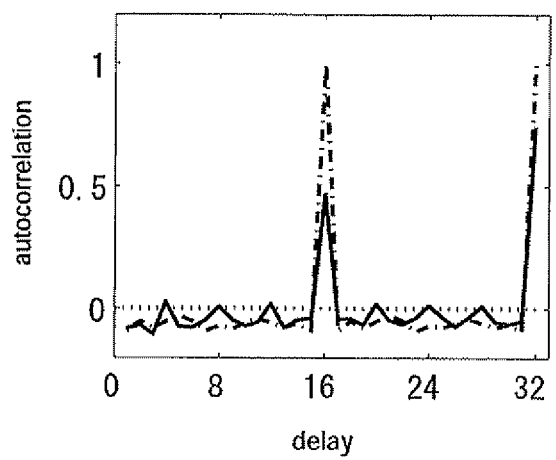
FIG. 7 shows a comparison between autocorrelations of the present invention (solid line) and the Box-Muller algorithm (dashed line) where bit random numbers appear periodically.

The method of the present invention can generate pseudo-Gaussian random numbers with greater performance than the existing methods even if the bit generating mechanism performs poor. As an ultimate example that emphasizes the difference between the present and existing methods, consider the case where the pseudo-Gaussian random numbers with 6-bit accuracy are generated by repeatedly using 16-bit random number sequences. FIG. 7 shows autocorrelation coefficients calculated from the generated pseudo-Gaussian random numbers. In FIG. 7, the solid line denotes the result obtained by the present invention, and the dashed line denotes the result obtained by the Box-Muller algorithm (the autocorrelation coefficients shown in FIG. 7 are averages of 100 trials). The Box-Muller algorithm generates a series with a cycle of 16 in this example, so that the autocorrelation becomes 1 at a delay of 16. In contrast, although the present method using the recurrence plots of a size of 64, for example, also shows an increase in the autocorrelation at a delay of 16, it is still smaller compared to that of the Box-Muller algorithm. Thus, it can be expected that the present invention generates the pseudo-Gaussian random numbers with higher quality than the existing methods.

According to the present invention, the random numbers following the normal distribution can be generated which do not generate a serial correlation.

The present invention should not be limited to the embodiments described above. A variety of modifications may be made based on the spirit of the present invention, and are intended to be within the scope Of the present invention.

Industrial Applicability

The mechanism for generating random numbers following the normal distribution according to the present invention can be available as a tool which can generate Gaussian random numbers that do not generate a serial correlation.

The invention claimed is:

1. A mechanism for generating random numbers following the normal distribution comprising:
   (a) a random recurrence plot generating mechanism for generating random recurrence plots; and
   (b) a recurrence plot-time series converting mechanism for converting the random recurrence plots from the random recurrence plot generating mechanism into time series, wherein (c) Gaussian random numbers are generated by the recurrence plot-time series converting mechanism.

2. The mechanism for generating random numbers following the normal distribution according to claim 1, wherein the recurrence plots are two-dimensional plots with two axes of time indexes for visualizing the time series, obtained by examining a pair of corresponding time indexes to see if they are neighbors, and plotting a corresponding point on a two-dimensional plane if they are or no point if not.

3. The mechanism for generating random numbers following the normal distribution according to claim 1, wherein the random recurrence plot generating mechanism includes a bit random number generating unit for generating bit random numbers and a recurrence plot storing unit for storing the bit random numbers generated by the bit random number generating unit as recurrence plots, and wherein the recurrence plot-time series converting mechanism includes a graph generating unit for generating a graph using information from the recurrence plot storing unit, a distance matrix generating unit for generating distance matrices using information from the graph generating unit, and a time series generating unit for generating time series using information from the distance matrix generating unit.

4. The mechanism for generating random numbers following the normal distribution according to claim 3, wherein the bit random numbers are generated by applying a one-dimensional chaos map implemented with electronic circuits.

5. The mechanism for generating random numbers following the normal distribution according to claim 3, wherein the bit random numbers are generated by applying a mechanism following the quantum mechanics.

6. The mechanism for generating random numbers following the normal distribution according to claim 5, wherein the mechanism following the quantum mechanics is spin orientations or time intervals of gamma-ray radiation.

* * * * *